United States Patent [19]

Boles et al.

[11] 3,807,971

[45] Apr. 30, 1974

[54] DEPOSITION OF NON-POROUS AND DURABLE TIN-GOLD SURFACE LAYERS IN MICROINCH THICKNESSES

[75] Inventors: John G. Boles, Hyde Park; Michael M. Haddad; David W. Rich, both of Poughkeepsie; Matthew C. Smith, Pleasant Valley, all of N.Y.

[73] Assignee: International Business Machines Corporation, Armonk, N.Y.

[22] Filed: Mar. 12, 1970

[21] Appl. No.: 19,109

[52] U.S. Cl. .................. 29/199, 117/217, 117/227, 117/230, 204/23, 317/234 M

[51] Int. Cl. .......................... B23p 3/00, B44d 1/18

[58] Field of Search ........... 117/217, 230, 231, 212, 117/227, 71, 71 M; 29/194, 195, 196.4, 199, 196.6; 204/46, 54 R, 54 L, 38 R, 38 S, 38 B, 40, 23; 317/234 M; 161/213

[56] References Cited

UNITED STATES PATENTS

| | | | |
|---|---|---|---|
| 2,995,475 | 8/1961 | Sharpless | 204/38 S UX |
| 1,567,625 | 12/1925 | Smith | 29/196.5 |
| 3,154,478 | 10/1964 | Lee | 117/217 X |
| 3,480,412 | 11/1969 | Duffek, Jr. et al. | 317/234 M |
| 3,242,565 | 3/1966 | North et al. | 204/38 B UX |
| 3,396,454 | 8/1968 | Murdock et al. | 317/234 M UX |
| 3,427,181 | 2/1969 | Lowery et al. | 117/227 X |

OTHER PUBLICATIONS

Bellinger, et al. "Practical Bright Acid Tin Plating," in Plating, pp. 1140, October 1967.

*Primary Examiner*—Cameron K. Weiffenbach
*Attorney, Agent, or Firm*—Robert Lieber

[57] ABSTRACT

It has been found that successive tin and gold deposits upon tin-receptive substrates, in combined deposit thicknesses under 100 microinches, have certain synergistic properties which are highly useful in the electrical arts. Although tin and gold deposits per se are highly porous, even in individual deposit thicknesses of 100 microinches, upon appropriately selected and prepared substrates composite deposits of selected thickness are found to have virtually zero porosity. The composite deposits have other desirable properties useful in electrical device manufacture. These include prolonged resistance to wear and corrosion, good conductivity, low surface contact resistance and surface receptiveness to union with solder.

1 Claim, No Drawings

DEPOSITION OF NON-POROUS AND DURABLE TIN-GOLD SURFACE LAYERS IN MICROINCH THICKNESSES

BACKGROUND OF THE INVENTION

1. Field of the Invention

This invention pertains to manufacture of gold plated electrical articles such as contacts and particularly to construction of thin but durable gold deposits by interposition of a thin deposit layer of tin between the gold and the main body of the article.

2. Description of the Prior Art

Tin-gold surface platings have been proposed for decorative effects (U.S. Pat. No. 2,104,269), with the tin deposited in a spangled form which would not have desirable properties.

We have found that uniform tin-gold surface platings in specific microinch thickness ranges, have unexpected properties useful in electrical device manufacture; including the properties of: low porosity, enhanced hardness, enhanced conductivity, low contact resistance, and surface receptiveness to union with solder.

SUMMARY

Our improvement consists in producing non-porous well-adhered durable conductive films by depositing uniform films of tin in the thickness range 15–40 microinches between surfaces of electrical articles to be gold plated and thin films of gold less than 45 microinches thick, the latter covering and intimately contacting the tin.

A more detailed aspect of the invention pertains to the electrolytic deposition of the tin from a bright acid tin electrolytic plating bath upon a substrate having a surface receptive to this particular form of electrolytic tin deposit; e.g., copper or steel.

The foregoing and other features, objects and advantages of the invention will be apparent from the following more particular description of preferred embodiments of the invention.

DETAILED DESCRIPTION

Examples of tin-gold surface platings, with physical and electrical properties, are described next.

EXAMPLE 1

(Contacts useful for test probing at light pressures):
Substrate:
copper wire
Method:
Bright tin (15–20 microinches) and gold (20–30 microinches) deposited successively by electrolytic deposition
Materials:
Bright tin plating bath:

| | |
|---|---|
| Sn metal from $SnSO_4$ | 40 g/l |
| $H_2SO_4$ | 50 g/l |

Wood tar distillate dispersed in octyl $H_2SO_4$ 5.0 – 20.0 g/l
Gold plating bath:
Sel-Rex Autotronex CI gold plating bath or equivalent
Plating Parameters:
Tin and gold baths maintained at room temperature
Plating times:
Tin: 2 min at 15–20 ASF
Gold: 5 min. at 10 ASF
Wash/rinse intermediate each plating operation.
Washing/Rinsing Procedures:
Original substrate prepared by cleansing and degreasing in Trichlorethylene, then dipped in 10% HCl solution — 30 sec. — and rinsed.
After tin deposition rinse.
Properties:
bright tin and gold finishes;
high order of adhesion;
zero porosity measured by gel method; wear resistance 25 percent greater than comparable gold films attached directly to nickel surfaces, highly receptive to solder union.

EXAMPLE 2

Gold plated pin type connectors with reduced thickness tin-gold films.
Substrate: Nickel
Method, material, parameters and rinsing procedures:
Same as Example 1.
Properties:
Same as Example 1, also low contact resistance.

EXAMPLE 3

Dull tin-gold
Substrate: copper
Method:
dull tin (30 microinches) deposited on copper substate by electroplating or immersion dipping;
gold (20–30 microinches) deposited on tin either by electrolytic or chemical reduction method.
Materials:
Tin bath — for electrodeposition — standard alkaline stannate bath (e.g., Metal & Thermit TinSol A); for immersion application — standard sodium stannate bath (e.g. Shipley Immersion Tin).
Gold bath — same as Example 1; suitable results also obtained with Selrex Lectroless.
Parameters:
Tin — by electrodeposition; same as Example 1 by immersion
Gold — Same as Example 1
Properties:
unacceptable porosity in excess of 40 percent.

EXAMPLE 4

Same as Example 3, except copper substrate was plated over with nickel film (15 microinches) before receiving tin coating.
Properties:
0 porosity, other properties comparable to Example 1.

EXAMPLE 5

Foil clad insulation for printed circuit applications.
Substrate:
Nickel clad insulative chip — e.g., ceramic, epoxy glass, plastic, etc. (actual specimen — epoxy glass).
Nickel layer — 15 microinches obtained by immersion of clear chip in sensitizer and nickel plating chemical reduction baths (GATC or Enthone) for 15–20 minutes at 195°F.

Method:

Deposit dull tin (15–20 microinches) upon the nickel film, rinse and deposit gold upon the tin film. These metals can if desired be deposited in a pattern via a photo resist mask. The deposition can also be of the non-electrolytic type, e.g., vacuum, sputtering, electroless, immersion, etc.

Materials and Parameters:

Same as Example 3.

Properties:

Same as Example 4.

EFFECT OF VARIATION OF TIN DEPOSIT THICKNESS

Example 1

At less than 15 microinches porosity increase noted. Between 15 and 45 microinches porosity test continued to indicate 0 porosity. At greater than 45 microinches flaking of the gold occurred.

Example 3

Specimens were produced with tin layer thicknesses of 10, 30 and 60 microinches. All specimens exhibited substantial porosity ranging from 20–30 percent (for the 60 microinch specimen) to 100 percent (for the 10 microinch specimen).

We have shown and described above the fundamental novel features of the invention as applied to several preferred embodiments. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. A laminate surface coating for electrical contact applications — characterized by absence of porosity and by possession of durability, resistance to corrosion and wear and low contact resistance — formed by adjacent deposits of tin and gold, in respective thickness ranges of 15–40 microinches of dull tin and about 20–35 microinches of gold, wherein said tin deposit is adhered to a substrate including at least 15 microinches of nickel at the adhesion interface with said tin deposit, and said gold deposit covers said tin deposit and forms an exposed outer surface suitable for entering into touching contact engagement with other conductor media to make and break electrical circuit connection, and the composite of said tin-gold deposits possesses the above characterized properties.

* * * * *